3,480,487
ARC WELDING COMPOSITIONS
Thomas L. Coless, Maplewood, and Kenneth W. Rimer, Carteret, N.J., assignors to Union Carbide Corporation, a corporation of New York
Filed Jan. 3, 1966, Ser. No. 518,161
Int. Cl. B23k 35/36
U.S. Cl. 148—26       5 Claims

ABSTRACT OF THE DISCLOSURE

A welding flux composition containing at least one stable oxide selected from the oxides such as aluminum, manganese, magnesium, titanium, calcium and silicon oxides. The sources of these oxides are selected so as to intentionally exclude high valence unstable oxides and to maintain such oxides, if present at all, to a limit of 5 wt.-percent.

---

Figure 1:
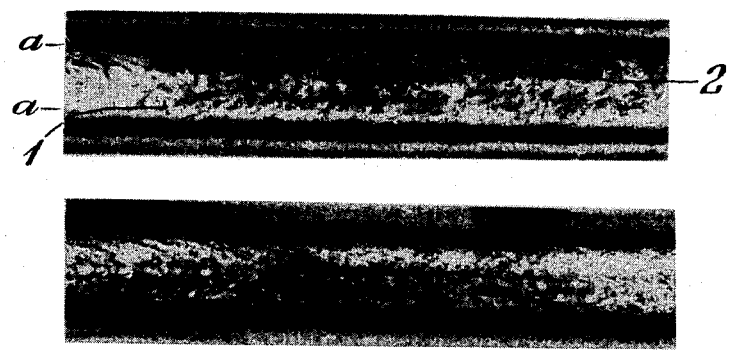

This invention relates to arc welding flux compositions and, more particularly, to such flux compositions which are deposited on a workpiece to submerge and protect the welding zone.

As the art of submerged arc welding has developed from the time of Jones et al., U.S. Patent 2,043,960, the industry has constantly sought new flux compositions to meet new welding applications or better flux compositions to improve old welding applications. Of course, a main object is always to improve flux compositions while either maintaining or reducing cost of the composition. Specifically, for example, fluxes are constantly sought which have better peeling of the fused slag; which produce smooth, sound-free welds free from surface defects; and which are useful with both A.C. and D.C. currents.

Accordingly, it is a main object of this invention to provide a flux composition which exhibits good peeling of fused slag while producing smooth, sound welds free from surface defects.

In accordance with the invention, a welding flux composition is provided where in the ingredients are selected so that easily reducible oxides such as $Fe_2O_3$, $Fe_3O_4$ and $MnO_2$ are kept to a minimum. These high valence easily reducible oxygen compounds are intentionally excluded from the flux composition and if present at all are impurities in some of the other ingredients.

It has been discovered that flux composition containing high valence easily reducible oxides produce undesirable surface imperfections. It is postulated that oxides such as $Fe_2O_3$, $Fe_3O_4$ and $MnO_2$ which have oxygen and which can be easily disassociated, give up their oxygen in the heat of the welding zone. The disassociated oxygen can react with the alloying elements in the wire and base metal to form oxides of these elements and render them ineffective. Carbon, for example, can combine with the disassociated oxygen in the arc to form a gaseous product (CO and $CO_2$). The evolution of these gases can disturb the molten weld metal to produce surface defects, typicaly called pocking. If there is a residual free oxygen available, porosity or pinholing in the weld may occur as well as pocking. Additionally, the disassociated oxygen reacts with deoxidizers in the welding wire and flux and renders the deoxidizers less capable of performing their function in the weld.

The flux composition of the invention contains at least one stable oxide essentially free from easily reducible oxides. Preferably the composition is provided with more than one oxide selected from oxides such as aluminum, manganese, magneisum, titanium, calcium, and silicon oxides or their equivalents. The selection of oxides as well as the other ingredients in flux compositions is determined by the particular welding properties desired. For example, a flux composition might contain essentially all aluminum oxide with some fluoride and deoxidizer ingredients. While such a composition may produce a good weld, the flux may have undesirable properties, such as flux removal, poor electrical properties, etc., which would render the flux unsuitable for practical applications. Therefore, the oxides are usually selected and proportioned relative to each other to provide a combination of all desirable welding characteristics.

Usually the flux composition of this invention contains in combination some amount of aluminum oxide, titanium dioxide, manganese oxide, magnesium oxide and silicon dioxide in the range of from about 80 to about 97 weight percent. The sources of these oxides are selected so as to intentionally exclude high valence unstable oxides and to maintain such oxides present as impurity to a minimum. Aluminum oxide can be added as bauxite, corundum, feldspar, or as an alumina bearing slag. Titanium dioxide is preferably added as rutile which is essentially $TiO_2$. However, other titania bearing compounds may be used such as titania slag with low iron oxides content. Manganese oxide is preferably added from an ore having very low percentages of $MnO_2$. Conventional manganese ore usually contains high percentages of $MnO_2$ such that the MnO and $MnO_2$ are present in equal proportions. Some high bearing $MnO_2$ ores may be used provided the $MnO_2$ is readily reducible to MnO during the furnacing operation in preparing the flux composition, or if such ore is calcined prior to use in the flux to liberate some of the oxygen. Magnesium oxide is added as calcined magnesite. Other sources of magnesium oxide may be used, for example magnesium oxide extracted from sea water.

The flux composition also contains a fluorine containing compound such as cryolite, $CaF_2$ and sodium fluoride or their equivalents in the range of from about 2 to about 10 weight percent. Fluorides are added for their beneficial effect on the weldability of the flux.

Deoxidizers are also included in the flux. Typical deoxidizers are silicomanganese, ferrosilicon, ferromanganese, ferromanganese silicon, calcium silicon or other materials, known as deoxidizers, which perform the same function. The deoxidizers are present in the range of from 1 to about 10 percent by weight.

All the ingredients are ground and mixed. The mixture is bonded with a silicate binder, for example sodium or potassium silicate, and then passed through a dryer having sufficient heat to drive off any moisture. It is important that any chemically combined water be driven off. In fact, it is important that the silicate binder, which is added as an aqueous solution, be fused thereby insuring complete removal of the water of hydration. Further during the heating operation, any carbonates present should be broken down so that the gaseous components are driven off.

The following table illustrates the usable range of ingredients in percent by weight in the flux of the invention as analyzed after the flux ingredients have been mixed together and dried as described above.

|  | Percent |
|---|---|
| $Al_2O_3$ | 30–60 |
| $TiO_2$ | 5–20 |
| MnO | 5–25 |
| Fluoride | 2–10 |
| MgO | 1–10 |
| $SiO_2$ | 3–25 |
| Deoxidizers | 1–10 |
| $Fe_2O_3$-$Fe_3O_4$-$MnO_2$ | <5 |

Specific preferred compositions in weight percent are indicated in the following table:

| Ingredients: | 1 | 2 | 3 | 4 |
|---|---|---|---|---|
| Al₂O₃ | 50 | 45 | 30 | 29 |
| TiO₂ | 12 | 8 | 20 | 5 |
| MnO | 8 | 4 | 20 | 10 |
| CaF₂ | 5 | 10 | 8 | 5 |
| MgO | 5 | 3 | 9 | 20 |
| SiO₂ | 17 | 24 | 5 | 20 |
| MnSi | 3 | 5 | 7 | 10 |
| Fe₂O₃-Fe₃O₄-MnO₂ | <3 | <3 | <5 | <5 |

The effect of the presence of high valence unstable oxides either in the flux or on the workpiece are illustrated in the drawings.

FIGURE 1 compares a weld made with a prior art flux (top) with a weld made with the present flux (bottom) on sand blasted plate, that is, plate which is free from any surface iron oxides. The weld made with the prior art flux which contained high valence oxides in excess of the limits herein set forth shows a center zone of disturbance indicated between lines A—A. Additionally within such disturbance one metallic protuberence as at 1, 2 and 3, for example, are evident. The weld made with the present flux (bottom) has a smooth surface free from protuberences.

The conclusion which is reached from this comparison is that under otherwise identical welding conditions and on an oxide free surface which is not the usual practical welding situation, the flux composition of the invention will produce smoother, imperfection free weld surfaces.

Figure 2:
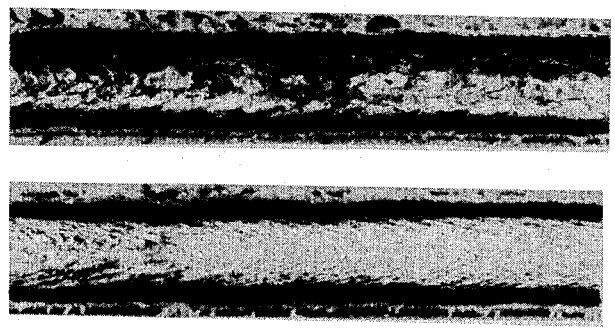

FIGURE 2 is similar to FIGURE 1 except that the welds were made on plate having mill scale on the surface thereof. Mill scale is $Fe_3O_4$ formed during the hot processing of the steel base metal. The prior art flux (top) produced a weld wherein the center disturbance is slightly more pronounced than on the sand blasted plate shown in FIGURE 1. The comparison shown in FIGURE 2 indicates that the flux of the invention is more tolerable to mill scale while still producing smooth sound welds.

Figure 3:
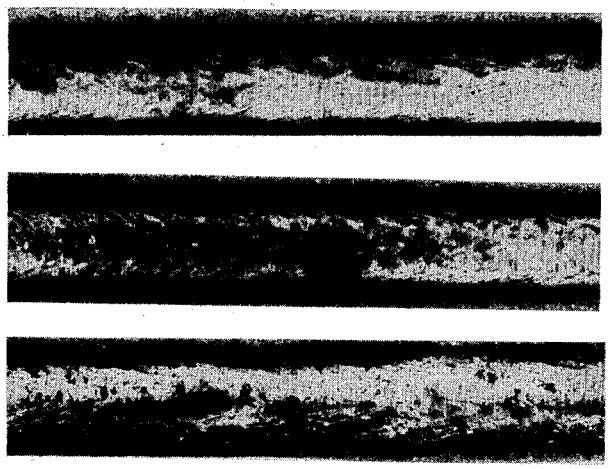

FIGURE 3 illustrates three welds made with the flux of the invention wherein increasing percentages of mill scale was added to the flux. The top weld was made with 3% mill scale added. This weld is smooth and essentially free of metallic protuberences. The middle weld was made with 5% mill scale added. The metal protuberences increased and the center of the weld begins to show disturbence. The bottom weld was made with 8% mill scale in the flux. The weld is highly disturbed with excessive surface imperfections.

Figure 4:
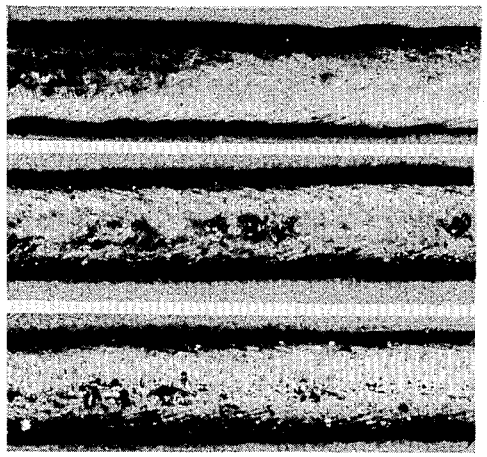

FIGURE 4 illustrates three welds made with the flux of the invention wherein increasing percentages of $Fe_2O_3$ were added to the flux. The top weld was made with 3% $Fe_2O_3$ added. The weld just begins to show metallic protuberences on the surface. The middle weld made with 5% $Fe_2O_3$ was added to the flux. Metallic protuberences are clearly in evidence. In the bottom weld the surface disturbance and imperfection is excessive. This weld was made with 8% $Fe_2O_3$ added to the flux.

Figure 5:
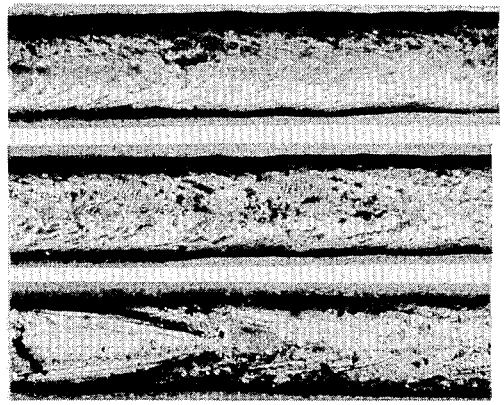

FIGURE 5 illustrates three welds made with the flux of the invention wherein increasing percentages of $Fe_3O_4$ obtained from an ore as contrasted with $Fe_3O_4$ obtained from mill scale were added to flux.

The top weld was made with 3% $Fe_3O_4$ added to the flux. The weld is good with protuberences just beginning to form on the surface. The middle weld was made with 5% $Fe_3O_4$ added to the flux. The surface is more disturbed with increased surface imperfections. The bottom weld was made with 8% $Fe_3O_4$ added to the flux. The surface is extremely bad with gross imperfections.

Figure 6:
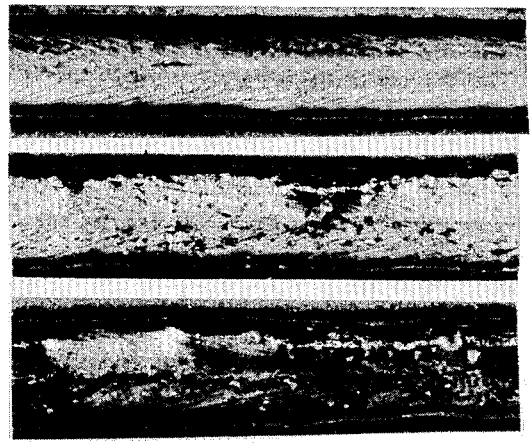

FIGURE 6 illustrates three welds made with the flux of the invention wherein increasing amounts of $MnO_2$ were added to the flux. The top weld was made with 3% $MnO_2$ added. This weld is good and relatively free of surface protuberences. The middle weld was made with 5% $MnO_2$ in the flux. The weld already exhibits disturbance and poor weld bead appearance. With 8% $MnO_2$ in the flux, the weld is completely unacceptable.

Thus, according to the invention the flux composition should contain less than about 5% of ingredients such as $Fe_2O_3$, $Fe_3O_4$ and $MnO_2$ in combination. Preferably the flux should contain less than about 3% of such materials.

Having described the invention with reference to certain preferred and specific embodiments, it should be understood that modification can be made within the scope of the invention without departing from the spirit thereof.

What is claimed is:

1. A welding flux composition consisting essentially of from about 30 to about 60 weight percent $Al_2O_3$ obtained from a naturally occurring material, from about 5 to about 20 weight percent $TiO_2$, from about 5 to about 25 weight percent MnO, from about 2 to about 10 weight percent of a fluoride selected from the class consisting of sodium fluoride, calcium fluoride and sodium aluminum fluoride, from about 1 to about 10 weight percent MgO, from about 3 to about 25 weight percent $SiO_2$, from about 1 to about 10 weight percent deoxidizers, and less than about 5 weight percent $Fe_2O_3$-$Fe_3O_4$-$MnO_2$.

2. A welding flux composition consisting essentially of the following ingredients: about 50 weight percent $Al_2O_3$, obtained from a naturally occurring material, about 12 weight percent $TiO_2$, about 8 weight percent MnO, about 5 weight percent $CaF_2$, about 5 weight percent MgO, about 17 weight percent $SiO_2$, about 3 weight percent MnSi, and less than about 3 weight percent $Fe_2O_3$-$Fe_3O_4$-$MnO_2$.

3. A welding flux composition consisting essentially of the following ingredients: about 45 weight percent $Al_2O_3$ obtained from a naturally occurring material, about 8 weight percent $TiO_2$, about 4 weight percent MnO, about 10 weight percent $CaF_2$, about 3 weight percent MgO, about 24 weight percent $SiO_2$, about 5 weight percent MnSi, and less than about 3 weight percent $Fe_2O_3$-$Fe_3O_4$-$MnO_2$.

4. A welding flux composition consisting essentially of the following ingredients: about 30 weight percent $Al_2O_3$, obtained from a naturally occurring material, about 20 weight percent $TiO_2$, about 20 weight percent MnO, about 8 weight percent $CaF_2$, about 9 weight percent MgO, about 5 weight percent $SiO_2$, about 7 weight percent MnSi, and less than about 5 weight percent $Fe_2O_3$-$Fe_3O_4$-$MnO_2$.

5. A welding flux composition consisting essentially of the following ingredients: about 29 weight percent $Al_2O_3$ obtained from a naturally occurring material, about 5 weight percent $TiO_2$, about 10 weight percent MnO, about 5 weight percent $CaF_2$, about 20 weight percent MgO, about 20 weight percent $SiO_2$, about 10 weight percent MnSi, and about 5 weight percent $Fe_2O_3$-$Fe_3O_4$-$MnO_2$.

References Cited

UNITED STATES PATENTS

| | | | |
|---|---|---|---|
| 3,211,591 | 12/1965 | Miltchitzky | 148—26 |
| 2,748,040 | 5/1956 | Conn | 148—26 |
| 3,068,128 | 12/1962 | Shrubsall et al. | 148—26 |
| 3,200,016 | 8/1965 | Sharav et al. | 148—26 |
| 2,895,863 | 7/1959 | Stringham et al. | 148—26 |

L. DEWAYNE RUTLEDGE, Primary Examiner

T. R. FRYE, Assistant Examiner

U.S. Cl. X.R.

148—23